US012026084B2

(12) United States Patent
Chen et al.

(10) Patent No.: US 12,026,084 B2
(45) Date of Patent: Jul. 2, 2024

(54) AUTOMATED TESTING OF MOBILE DEVICES USING VISUAL ANALYSIS

(71) Applicant: T-Mobile USA, Inc., Bellevue, WA (US)

(72) Inventors: Dong Chen, Lansing, MI (US); Anqi Luo, Redmond, WA (US); Pei Zheng, Sammamish, WA (US); Tor Fredericks, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 220 days.

(21) Appl. No.: 17/094,741

(22) Filed: Nov. 10, 2020

(65) Prior Publication Data

US 2022/0147437 A1 May 12, 2022

(51) Int. Cl.
*G06F 11/36* (2006.01)
*G06F 3/04817* (2022.01)
*G06N 20/00* (2019.01)

(52) U.S. Cl.
CPC ...... *G06F 11/3664* (2013.01); *G06F 11/3688* (2013.01); *G06N 20/00* (2019.01); *G06F 3/04817* (2013.01)

(58) Field of Classification Search
CPC ............. G06F 11/3664; G06F 11/3688; G06F 3/04817; G06N 20/00
See application file for complete search history.

(56) References Cited

U.S. PATENT DOCUMENTS

| | | |
|---|---|---|
| 7,102,765 B1 | 9/2006 | Abi-Saleh et al. |
| 8,862,118 B2 | 10/2014 | Whidden |
| 8,990,774 B2 * | 3/2015 | Amintafreshi ...... G06F 11/3688 717/124 |
| 9,519,570 B2 * | 12/2016 | Srinivasan .......... G06F 11/3664 |
| 10,853,232 B2 | 12/2020 | Henry et al. |

(Continued)

FOREIGN PATENT DOCUMENTS

| | | |
|---|---|---|
| EP | 3477923 A1 | 5/2018 |
| WO | WO2021061185 A1 | 4/2021 |

OTHER PUBLICATIONS

Vuong et al., "A Reinforcement Learning Based Approach to Automated Testing of Android Applications", published by ACM, A-TEST '18, Nov. 5, 2018, Lake Buena Vista, FL, USA, pp. 31-37 (Year: 2018).*

(Continued)

*Primary Examiner* — S. Sough
*Assistant Examiner* — Zheng Wei
(74) *Attorney, Agent, or Firm* — Lee & Hayes, P.C.

(57) ABSTRACT

Described herein are techniques that may be used to automate testing of services on mobile devices using visual analysis. In some embodiments, a machine learning model is trained using interaction data received from a number of mobile devices by correlating user selections with visual elements (e.g., icons). During execution of a testing routine on a mobile device, screenshots are obtained of a screen of the mobile device and provided to the machine learning model. An action is generated based on the provided screenshot that simulates a user action (e.g., a user touch on the screen of the mobile device) at a location of an icon or other visual element associated with the testing routine. These steps are repeated until an end-state of the testing routine is detected.

17 Claims, 7 Drawing Sheets

(56) References Cited

U.S. PATENT DOCUMENTS

| | | | |
|---|---|---|---|
| 10,909,503 B1* | 2/2021 | Dias | G06N 20/00 |
| 2008/0148235 A1* | 6/2008 | Foresti | G06F 11/3604 717/125 |
| 2011/0310041 A1 | 12/2011 | Williams et al. | |
| 2012/0243745 A1* | 9/2012 | Amintafreshi | G06F 11/3692 382/103 |
| 2015/0269059 A1* | 9/2015 | Srinivasan | G06F 11/3664 714/38.1 |
| 2018/0197103 A1* | 7/2018 | Petursson | G06N 20/00 |
| 2019/0227916 A1* | 7/2019 | Yedalla | G06F 11/3692 |
| 2020/0117577 A1* | 4/2020 | Saxena | G06F 18/217 |
| 2020/0379889 A1* | 12/2020 | Hamid | G06F 11/3688 |
| 2021/0081294 A1* | 3/2021 | Golubev | G06F 11/3688 |
| 2021/0081308 A1* | 3/2021 | Golubev | G06F 11/3688 |
| 2021/0089438 A1* | 3/2021 | Gardner | G06F 11/3466 |
| 2021/0203782 A1 | 7/2021 | Vymenets, Jr. et al. | |
| 2022/0004898 A1* | 1/2022 | Sinha | G06N 3/045 |
| 2022/0171510 A1 | 6/2022 | Fredericks et al. | |
| 2022/0206931 A1 | 6/2022 | Hwang et al. | |

OTHER PUBLICATIONS

Bhanapal et al., "An Innovative System for Remote and Automated testing of Mobile Phone Applications", published by IEEE, 2012 Service Research and Innovation Institute Global Conference, pp. 44-54 (Year: 2012).*

Bo et al., "MobileTest: A Tool Supporting Automatic Black Box Test for software on Smart Mobile Devices", published by IEEE, computer society, Second International Workshop on Automation of Software Test (AST'07), pp. 1-7 (Year: 2007).*

Linares-Vasquez et al., "Mining Android App Usages for Generating Actionable GUI-based Execution Scenarios", published by Cornell University, Proceedings of the 12th IEEE Working Conference on Mining Software Repositories (MSR'15), p. 1-12 (Year: 2018).*

Borges Jr. et al., "DroidMate-2: A Platform for Android Test Generation", published by ACM, ASE '18, Sep. 3-7, 2018, Montpellier, France, pp. 916-919 (Year: 2018).*

Office Action for U.S. Appl. No. 17/674,557, mailed on Aug. 10, 2023, Fredericks, "Automated Testing of Mobile Devices Using Behavioral Learning", 16 pages.

Borges Jr. et al., "Guiding App Testing with Mined Interaction Models", IEEE 5th International Conference on Mobile Software Engineering and Systems, May and Jun. 2018, pp. 133-143.

Garousi et al., "Visual GUI testing in practice: An extended industrial case study", Cornell University, May 20, 2020, pp. 1-33.

Office Action for U.S. Appl. No. 17/674,557, mailed on Feb. 20, 2024, Fredericks et al., "Automated Testing of Mobile Devices Using Behavioral Learning", 19 pages.

* cited by examiner

AUTOMATED TESTING OF MOBILE DEVICES USING VISUAL ANALYSIS

BACKGROUND

A number of service providers provide services that are implemented across a number of different types (e.g., models) of electronic devices. For example, a wireless carrier may provide cellular service that is accessible to a large variety of different mobile devices. In this example, the service may be available to mobile devices of different brands, models, and/or operating systems. However, providing services to a large number of different types of devices can be problematic. For example, when a service provider wishes to update its services, those updates must be tested out on each of the number of different types of devices to ensure continued availability of the services.

SUMMARY

Techniques are provided herein for enabling automated testing of mobile devices using visual analysis. In some embodiments, these techniques involve a process that begins with capturing screenshot images from a mobile device. Provided that a failure is not detected via the screenshot, the process then involves determining an icon or other visual element within the screenshot that is to be selected. One or more machine vision techniques (e.g., optical recognition) may be used to identify a location of the icon or other visual element within the screenshot image. The process then involves simulating an action (e.g., a user touch) at the identified location. This process is repeated until a testing routine is either completed or failed.

In one embodiment, a method is disclosed as being performed by a testing system, the method comprising receiving a request to complete a testing routine on a mobile device, until determining that the testing routine is complete, repeating a process that comprises: obtaining a current snapshot of a screen of the mobile device, determining, based on the current snapshot, whether testing is complete, upon determining that testing is not complete, determining a next testing action for the mobile device based on the current snapshot, and executing the next testing action for the mobile device, and responding to the request with whether the testing routine is a failure or success based upon the current snapshot.

An embodiment is directed to a computing device comprising: a processor; and a memory including instructions that, when executed with the processor, cause the computing device to receive a request to complete a testing routine on a mobile device, until determining that the testing routine is complete, repeating a process that comprises: obtaining a current snapshot of a screen of the mobile device; determining, based on the current snapshot, whether testing is complete; upon determining that testing is not complete, determining a next testing action for the mobile device based on the current snapshot; and executing the next testing action for the mobile device, and respond to the request with whether the testing routine is a failure or success based upon the current snapshot.

An embodiment is directed to a non-transitory computer-readable media collectively storing computer-executable instructions that upon execution cause one or more computing devices to collectively perform acts comprising receiving a request to complete a testing routine on a mobile device, until determining that the testing routine is complete, repeating a process that comprises: obtaining a current snapshot of a screen of the mobile device; determining, based on the current snapshot, whether testing is complete; upon determining that testing is not complete, determining a next testing action for the mobile device based on the current snapshot; and executing the next testing action for the mobile device, and responding to the request with whether the testing routine is a failure or success based upon the current snapshot.

Embodiments of the disclosure provide several advantages over conventional techniques. For example, conventional automated testing techniques for mobile devices have limited adaptability. The embodiments described herein, on the other hand, provide for the ability to automate testing for a mobile device in a manner such that the testing is adapted to changes made to that mobile device. Such automated testing techniques can be performed even if significant changes are made to various elements of the mobile device. For example, even if the names and/or locations of various icons are changed on a mobile device/operating system, the testing techniques can still be completed.

In embodiments of the proposed system, tests conducted by testers are used to train a machine learning model on what visual objects are to be selected and in what order. During training, each time that a tester selects a visual object, a screenshot is captured and a location on the screenshot can be associated with a step in a testing routine. In this way, the machine learning model can be trained so that testing a particular model of mobile phone requires selecting this location/icon, then selecting this location/icon, etc. The system would not require testing scripts and would be able to automatically adapt testing to mobile devices and operating systems (OS) that require additional/fewer steps. Additionally, embodiments of the disclosure can be easily migrated to new phone models without any code-level changes which means the system can perform the tests automatically. In such embodiments, there is no need to design testing flows which are needed in conventional testing automation systems.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
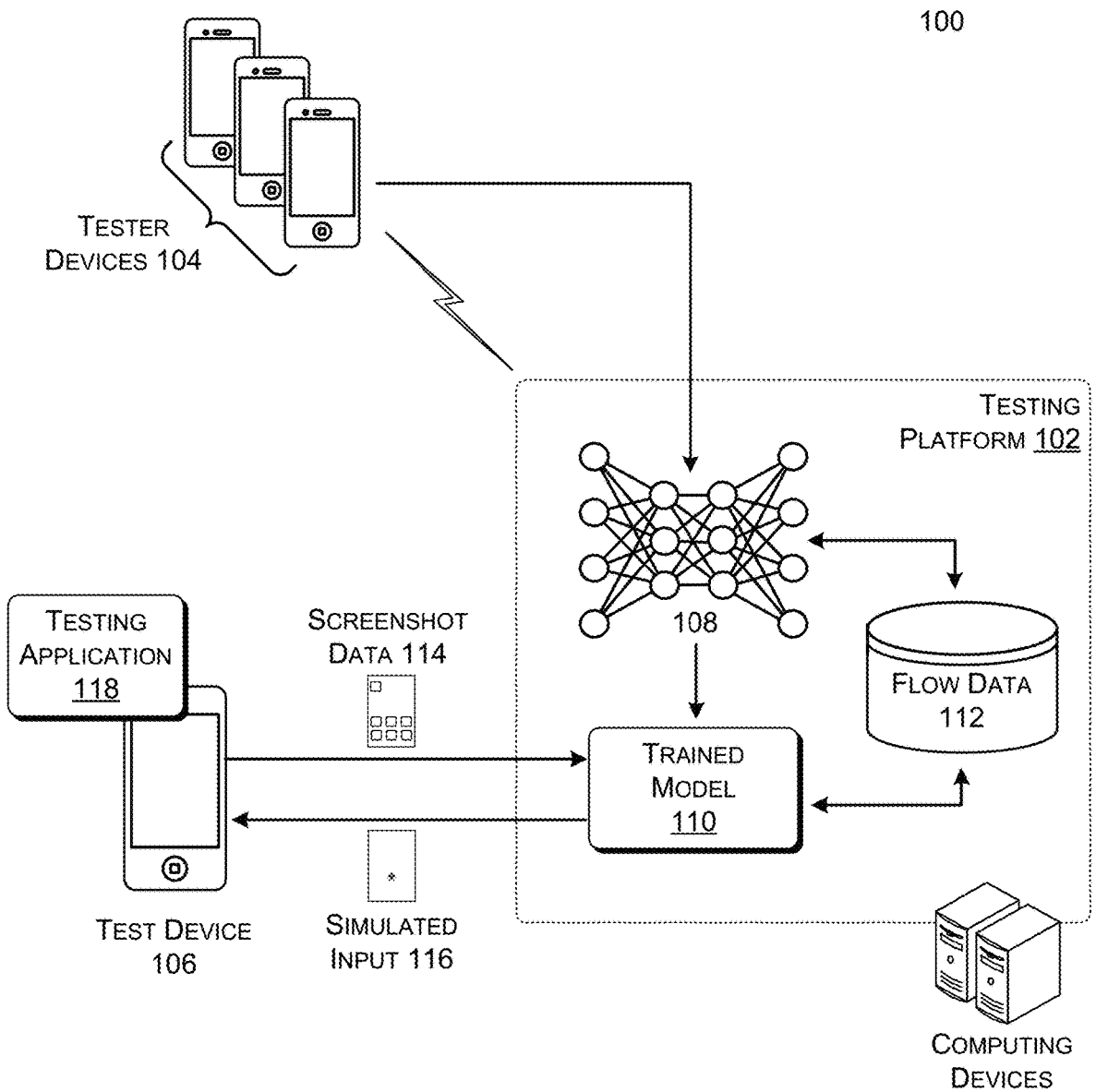
FIG. 1 illustrates an example architecture of a testing system that provides for automated testing of a mobile device using analysis of visual data in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to automate testing of services on mobile devices using visual analysis. Conventionally, when an operator of a service that is provided to multiple types of devices, or devices with multiple types of software (e.g., operating systems), wishes to make an update to that service, the update may first be tested in relation to each of the multiple types of devices and/or types of software. This can be time consuming and expensive, especially when updates are frequently made to the service. Automated testing can be used to reduce the time and expense associated with testing. However, such automated testing must simulate how a user would naturally use the device in order to be effective. In the case of mobile devices, this means that functions and applications are accessed via selection of an icon on the screen of the mobile device. While automated testing techniques exist that rely upon the use of text elements associated with those icons, such testing techniques are fallible. For example, an automated testing technique may store an indication of an icon name to be called at a certain point in the test. However, if a developer associated with that icon changes the icon name, then the whole test will be failed when the icon is unable to be accessed. Accordingly, existing automated testing techniques are not capable of automatically adapting to device changes.

A testing routine is a series of steps performed on a mobile device to complete a test of hardware and/or software on the mobile device. A testing routing may be associated with a particular function of the mobile device and/or a user goal (e.g., make a call). In some embodiments, a testing platform as described herein may maintain a data store of testing "flows." A testing flow, for the purposes of this disclosure, may include an ordered series of steps generated by a user (e.g., an administrator) to be performed during execution of a testing routine on a mobile device. In some embodiments, separate testing flows may be maintained for each combination of type of mobile device and mobile device operating system.

In embodiments as described herein, a machine learning model is trained using interaction data received from a number of mobile devices by correlating user selections with visual elements (e.g., icons). In embodiments, during execution of a testing routine on a mobile device, screenshots are obtained of a current screen of the mobile device and provided to the machine learning model. Instructions are generated based on the provided screenshot that simulate a user action (e.g., a user touch on the screen of the mobile device) at a location of an icon or other visual element associated with the testing routine. These steps are repeated until an end-state of the testing routine is detected.

FIG. 1 illustrates an example architecture of a testing system that provides for automated testing of a mobile device using analysis of visual data in accordance with some embodiments. In the testing system 100, a testing platform 102 is in communication with multiple mobile devices (e.g., tester devices 104) operated by a number of testers/operators. The testing platform 102 may be further in communication with a mobile device (e.g., test device 106) for which testing is to be automated.

A testing platform 102 may be comprised of a number of computing devices and may provide automated testing for a number of test devices. For example, the testing platform may be implemented as a software application installed upon a number of computing devices that execute instances of testing software. In some embodiments, the computing devices may comprise a distributed network of computing nodes (e.g., a cloud computing environment).

The computing devices of the testing platform 102 may include instructions that implement a machine learning algorithm 108. The machine learning algorithm 108 may be trained using data received from the tester devices 104 to generate a trained model 110. The data received from the tester devices may include interaction traces that include any suitable information on interactions between the tester and the tester device. In some embodiments, flow data 112 may be generated that includes an ordered series of steps to be taken during a training routine. Each step in the ordered series of steps may include an indication of a visual element to be selected during that step.

The machine learning algorithm 108 may include any suitable machine learning techniques that may be used to learn processes performed by testers. For example, the machine learning algorithm 108 may include a deep learning neural network. In some embodiments, the machine learning algorithm 108 may be trained on data provided by a number of tester devices 104. For example, the machine learning algorithm 108 may receive screenshot data from the tester devices 104 as well as user input data corresponding to actions taken by a tester/operator of the tester devices 104 with respect to the screenshot data. The screenshot data may include images captured from a screen of the tester device 104. The tester input data may include an indication of an action taken by the tester of the tester device on the screen of the test device 106. For example, the tester input data may include a location upon the screen of the tester device selected (e.g., touched) by the tester. The machine learning algorithm 108 may then generate the trained model 110 to include a correspondence between screenshot data and the tester input data.

A mobile device (such as tester devices 104 or the test device 106) is any electronic device that is capable of establishing a communication session with another electronic device. In some embodiments, a mobile device may include in its memory a mobile application that enables at least a portion of the functionality described herein. In some embodiments, a test device 106 may be capable of remotely executing actions instructed by the testing platform 102. For example, the testing platform may cause the test device 106 to capture a current screenshot 114 from a screen of the test device 106 that is then provided to the testing platform 102.

In some embodiments, the testing platform 102 may be in communication with a number of test devices 106, each of which are of a different type (e.g., model) and/or operating system. The testing platform 102 may communicate with the test device 106 via any suitable connection. For example, the test device 106 may communicate with the testing platform 102 via a wired or wireless communication mechanism.

In some embodiments, the screenshot 114 may be processed by the testing platform 102 based on a flow associated with a testing routine being performed. Information related to such a flow may be stored in flow data 112. In such embodiments, each step in a flow associated with a testing routine may include an indication of visual identifier (e.g., an icon) that represents an area to be selected for the step. For example, executing a testing routine on the test device 106 may first involve retrieving a flow for the testing routine from the flow data 112. Executing the testing routine may then involve repeating a process that includes capturing a screenshot on the test device 106, using one or more optical recognition techniques to identify an area matching a target visual identifier for a current step of the retrieved flow, and providing instructions to the test device 106 that causes the identified area to be selected. This process may be repeated for each step in the flow. In some embodiments, the testing routine may be failed if a captured screenshot does not include the target visual identifier. The testing routine may be passed upon reaching the end of the retrieved flow without detecting a failure.

In some embodiments, the screenshot 114 may be processed as input to the trained model 110 in order to execute a testing routine. Such embodiments may not require the use of a flow during execution of a testing routine. For example, rather than retrieving a flow from the flow data 112, a current screenshot may be provided to the trained model 110, which may then determine a next action to be performed in the testing routine based on behavior learned from testers/operators. The testing routine executed on the test device 106 may include as many, or as few, steps as are typically performed for a testing routine typically performed on tester devices 104 of the same type/operating system as the testing device 106.

In some embodiments, execution of a testing routine may be performed on the test device by a testing application 118 installed upon, and executed from, the test device 106. For example, a testing application 118 may comprise a software application that causes the test device 106 to establish communication with the testing platform 102.

A number of interactions may occur between various components of the architecture 100 during a process in which automated testing of a test device may be performed. In this process, testing may initially be performed via a number of tester devices 104 that are operated by testers running a testing routine. During the testing routine, screenshots may be captured from the screen of the mobile device after each action performed by the tester. The screenshots are provided to a testing platform along with an indication of each action performed by the tester. The action data and screenshot data are then provided to a machine learning algorithm that creates a trained model based on the data in which tester actions are corresponded to visual elements within the screenshot data.

Once a trained model has been generated, a testing routine may be performed on a test device 106 in an automated manner using that trained model. To do this, a screenshot 114 may be captured of a screen of the mobile device. The trained model may then be used to correlate a tester action with portions of the captured screenshot. More particularly, the trained model may be used to generate a set of instructions that, when executed, simulate a user input 116 to be executed on the test device 106. After the user input 116 is executed on the test device 106, another screenshot is captured, and another user interaction may be determined for the test device 106 based on that screenshot.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
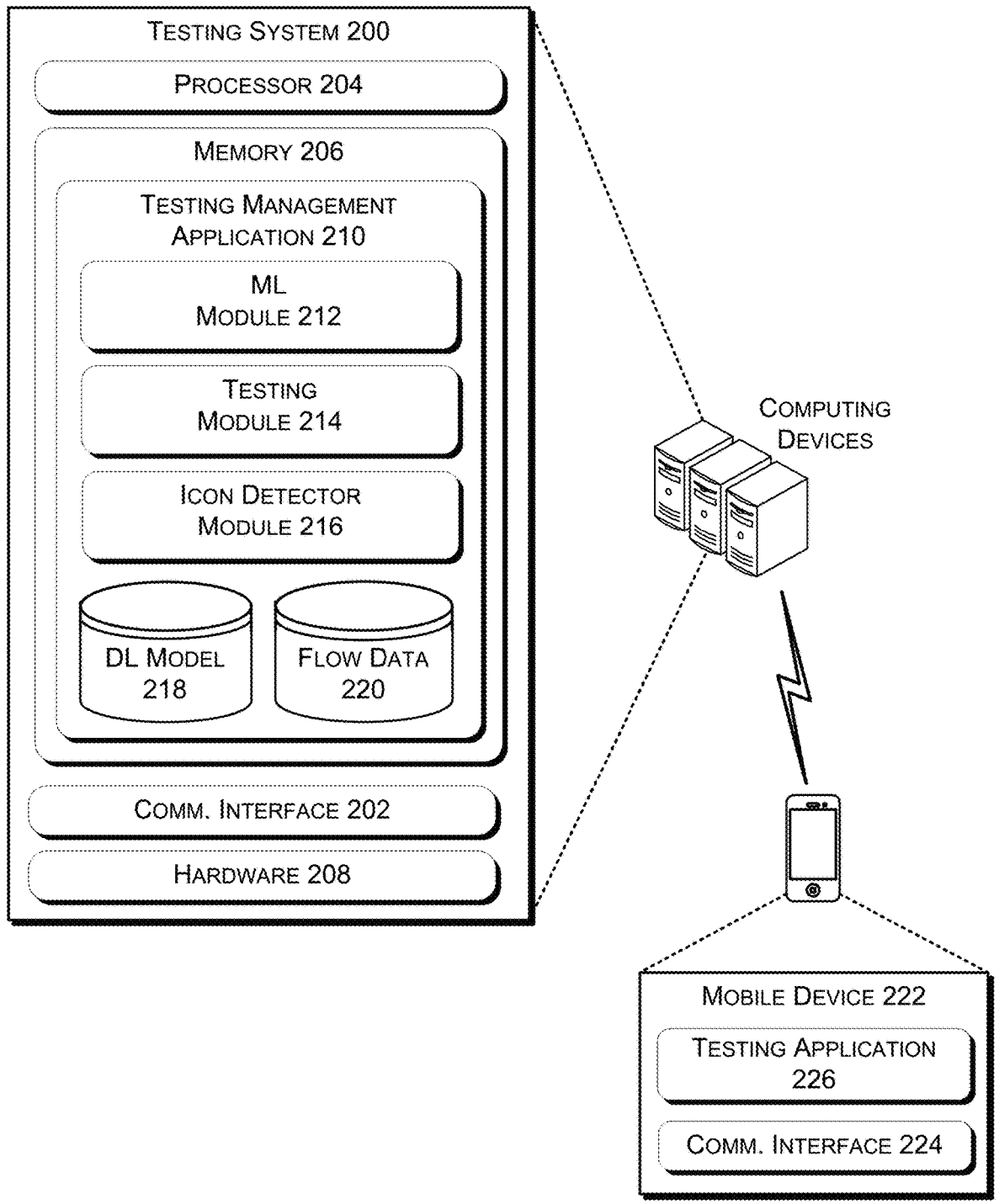
FIG. 2 is a block diagram showing various components of a computing system architecture that supports a testing platform for automating testing of a mobile device using visual analysis.

FIG. 2 is a block diagram showing various components of a computing system architecture that supports a testing platform for automating testing of a mobile device using visual analysis. The system architecture may include a testing system 200 that comprises one or more computing devices. The testing system 200 may include a communication interface 202, one or more processors 204, memory 206, and hardware 208. The communication interface 202 may include wireless and/or wired communication components that enable the testing system 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The testing system 200 can include any computing device configured to perform at least a portion of the operations described herein. The testing system 200 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The testing system 200 can include one or more virtual machines running virtual operating systems, or other computing architectures involving virtualization such as one or more flexible pools of logical storage devices that can be virtualized to maintain virtual storage devices for the computer. For example, the testing system 200 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the testing system 200 may implement functionality from a testing management application 210 that includes one or more software modules and data stores. Such software modules may include routines, program instructions, objects, and/or data structures that are executed by the processors 204 to perform particular tasks or implement particular data types. The testing management application 210 may include a machine learning (ML) module 212 that generates correlations between visual elements and user actions, a testing module 214 that determines testing actions and executes those actions on a mobile device, and an icon detector module 216 that provides information on locations and categories of visual elements. The data stores may include a trained machine learning model 218 that has been trained on testing data with respect to a mobile device as well as flow data 220 that indicates steps to be taken during a testing routine.

The machine learning module 212 may be configured to, in conjunction with the processor 204, generate a learning model that is trained to correlate a screenshot image or particular portions of a screenshot image with a state within a testing routine. For example, the machine learning module 212 may comprise a neural network or other suitable machine learning algorithm that accepts screenshot images as input and user action data as outputs. Such a neural network may then determine correlations between the inputs and the outputs. In some embodiments, the machine learning module 212 may be configured to identify a current step associated with a testing flow associated with a testing routine based on the received snapshot. The machine learning module 212 may then determine a next user action based on the current step. For example, the machine learning module 212 may identify the next step in a testing routine based on a received screenshot. In some embodiments, the machine learning module 212 may be trained to identify a testing routine failure based on the snapshot. For example, a testing routine failure may be determined if a received snapshot does not match an expected snapshot.

The testing module 214 may be configured to, in conjunction with the processor 204, cause the testing system to run a testing routine on a mobile device without user interaction. To do this, the testing module 214 may cause a mobile device (e.g., via a testing application installed upon the mobile device) to capture a screenshot of what is currently being presented on a screen of the mobile device. The testing module 214 may receive the captured screenshot via a communication session. In some embodiments, the testing module 214 then provides the screenshot to the trained model to determine a next action to be performed. Additionally, the screenshot may be provided to the icon detector module 216 in order to determine locations and categories of icons displayed in the snapshot. The testing module 214 then generates a user action by identifying an icon associated with the next action as determined via the trained model and its corresponding location as determined by the icon detector module 216. The testing module 214 then provides the user action to the mobile device to be executed. The testing module 214 may continue to run the testing routine until a failure condition or success condition is determined.

The icon detector module 214 may be configured to, in conjunction with the processor 204, identify a number of icons within snapshot data. To do this, the icon detector module 214 receives a snapshot image as input and uses optical recognition techniques to identify and classify particular icons within the snapshot. In some embodiments, this may involve comparing a library of known icons to graphical representations detected within the snapshot. Icons may be classified based on their similarity to known icons. A set of coordinates are then determined for each icon within the snapshot, the coordinates representing a location of the icon within the snapshot. In some embodiments, coordinates for a particular icon may represent a point located at the center of that icon. The icon detector module 214 may then be configured to return a list of available icons by category along with the corresponding locations for those available icons.

As noted elsewhere, the testing system 200 may be in communication with a number of mobile devices 222. Such a mobile device 222 may be any electronic device capable of interacting with the testing system 200 as described herein. Examples of such mobile devices 222 are tester devices 104 and/or the test device 106 as described with respect to FIG. 1 above. The mobile device 222 may include a processor and a computer readable memory as well as a communication interface 224. The computer readable memory of the mobile device 222 may include a testing application 226 that enables interaction between the mobile device 222 and the testing system 200. In some embodiments, execution of the testing application 226 on the mobile device 222 may cause the mobile device 222 to instantiate a testing routine as described herein. In some embodiments, the testing application 226 may execute as a background program on the mobile device 222 that performs the testing routine.

The communication interface 224 may include wireless and/or wired communication components that enable the mobile devices to transmit or receive data via a network, such as the Internet. In some embodiments, the communication interface 224 may include both short-range and long-range communication mechanisms. In some embodiments, communications between mobile devices may be established via a short-range communication mechanism of the communication interface 224 whereas communications between a mobile device and the testing system 200 may be established via a long-range communication mechanism.

The testing application 226 may cause the mobile device 222 to interact with the testing system 200. For example, a communication session may be established between the testing system 200 and the mobile device 222 via the respective communication interfaces 202 and 224. In some embodiments, the testing application 226 may provide the mobile device 222 with access to functionality provided via one or more modules (e.g., the testing management application 210) implemented on the testing system 200, as well as provide the mobile device 222 with the abilities to send data to the one or more modules and receive instructions from the one or more modules. This may be done via the use of one or more application programming interfaces (APIs) associated with the testing system. For example, a testing application 226 on the mobile device may call such an API to access functionality provided by the testing system. In some embodiments, the testing application 226 may receive instructions from the testing management application 210 in relation to actions to be performed on the mobile device and may execute those actions. For example, the testing application 226 may capture a screenshot image representative of a images displayed on the screen of the mobile device by activating a built-in screen capture function of the mobile device operating system. The testing application 226 may then provide that screenshot to the testing system 200 via the established communication session. The testing application 226 may receive an indication of a user input to be executed and may cause the mobile device to execute that user input. For example, the mobile device may simulate a user's touch on the screen of the mobile device at a specified location. In some cases, the testing application does this by sending a set of screen coordinates (e.g., the location) and a touch input to an API of the operating system program module of the mobile device responsible for processing screen touch inputs.

Figure 3:
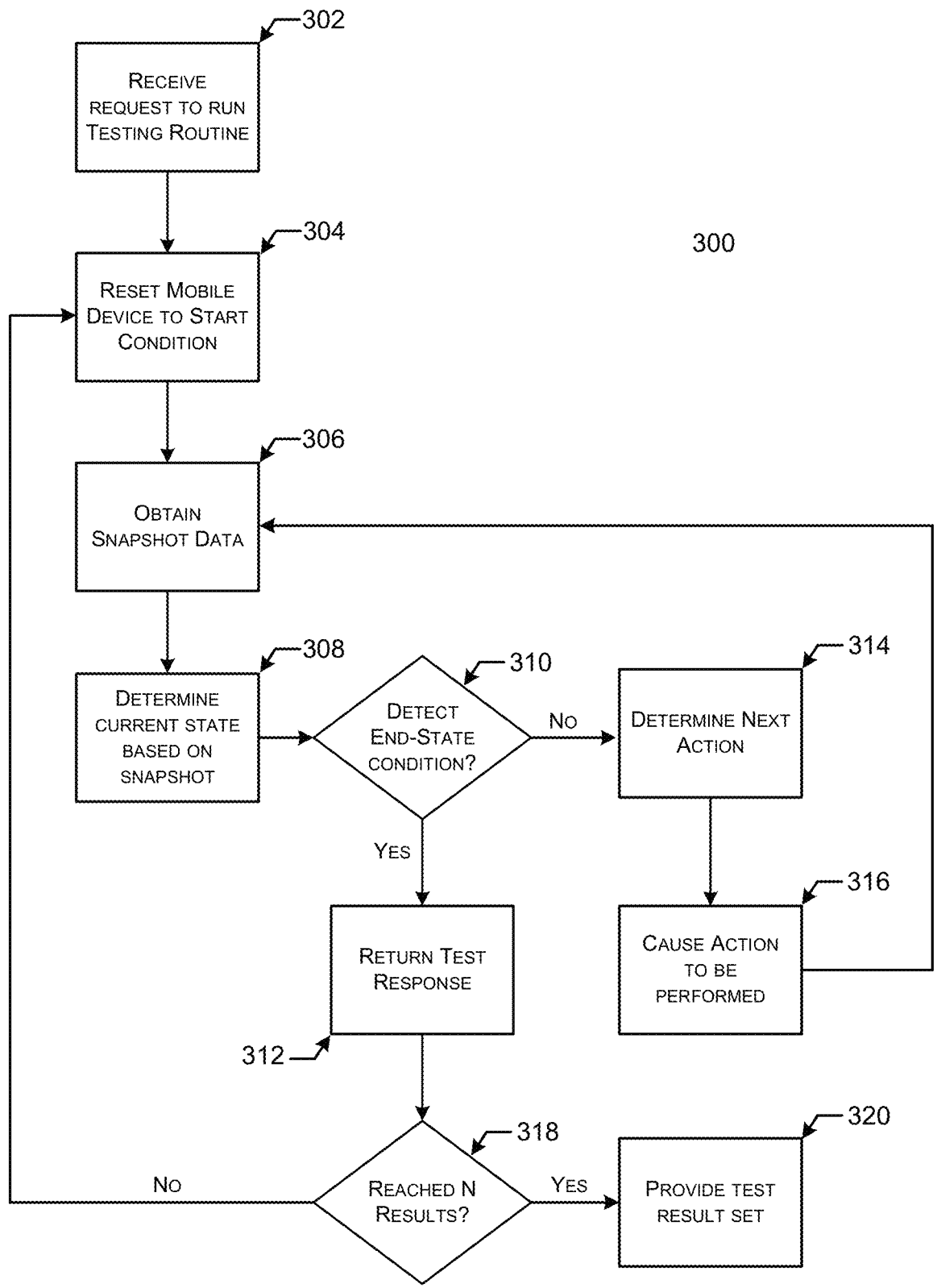
FIG. 3 depicts a flow diagram showing an example process flow for automating testing of a mobile device in accordance with embodiments.

FIG. 3 depicts a block diagram showing an example process flow for automating testing of a mobile device in accordance with embodiments. The process 300 involves interactions between various components of the architecture 100 described with respect to FIG. 1. More particularly, the process 300 involves interactions between a testing platform 102, tester devices 104, and a test device 106.

At 302, the process 300 comprises receiving a request to run a testing routine. In some embodiments, the request may be associated with a particular type of mobile device and/or operating system. In some embodiments, the request may be associated with a particular testing routine related to an action (e.g., make a phone call, send a text message, access a website, etc.).

At 304, the process 300 comprises obtaining snapshot data from the mobile device. In some embodiments, this involves capturing a visual element of what is currently displayed upon a screen of the mobile device. In some cases, this may involve an activation of a snapshot function on the mobile device. In some embodiments, the testing routine is performed on the mobile device (e.g., via a testing application). In some embodiments, the snapshot data is transmitted to a testing system remote from the mobile device as described.

At 306, the process 300 comprises determining a current state of the testing routine based upon the obtained snapshot data. In some embodiments, the process may identify a snapshot image that is expected at a particular stage of the testing routine. In these embodiments, the process may then compare the obtained snapshot data to the expected snapshot to determine a degree of similarity. In some embodiments, one or more visual elements may be identified as being relevant to the testing routine. In some cases, a current state of the testing routine may be determined from the one or more visual elements. For example, a current step of the testing routine may be identified based on the determined one or more visual elements. In other words, a state of the testing routine may be determined based on what screen is being presented on the mobile device. In some embodiments, if a determined state does not match an expected state, then instructions may be provided to the mobile device to cancel or exit out of one or more applications and return to a home screen.

At 308, the process 300 comprises detecting whether the current condition represents an end-state condition. In some embodiments, an end-state condition may be any state that is indicative of either a testing routine success or a testing routine failure. In some embodiments, a success state condition may be associated with the inclusion of certain visual elements within the screenshot and/or a completion of some set of steps or actions. For example, a testing routine related to completing a call on a mobile device may be determined to be successful upon the display of a "call ended" screen on the mobile device. In some embodiments, a failure condition may be detected upon determining that the screenshot data does not match an expected screenshot data or that a similarity between the obtained screenshot data and the expected screenshot data. For example, upon determining that the obtained screenshot data is lacking at least one expected visual element that is used to proceed with the testing routine, a failure condition may be detected.

Upon determining that the current state of the testing routine is an end-state ("Yes" from decision block 308), the process 300 may comprise returning a response at 310. In some embodiments, this may involve providing an indication of a failure or success to the testing system in relation to the testing routine.

Upon determining that the current state of the testing routine is not an end-state ("No" from decision block 308), the process 300 may comprise determining a next action at 312. In some embodiments, this may comprise identifying a user input associated with the determined current state. In some cases, the user input is associated with a particular visual element located within the screenshot data. In such cases, the user input may comprise a selection of an object at a location of the visual element within the screenshot as determined. For example, the determined action may be to simulate a user touch at the location of the visual element.

At 314, the process 300 comprises causing the determined action to be performed. In some embodiments, this involves providing instructions to the mobile device that cause it to perform the determined action. For example, the instructions may cause the mobile device to detect a user touch at a particular location on the screen even though no such user touch has been made. It should be noted that the process 300 involves a loop that is exited upon detection of an end-state condition. Hence, in embodiments in which such a loop is implemented, the system need not know in advance the number of steps to be performed in a testing routine.

Figure 4:
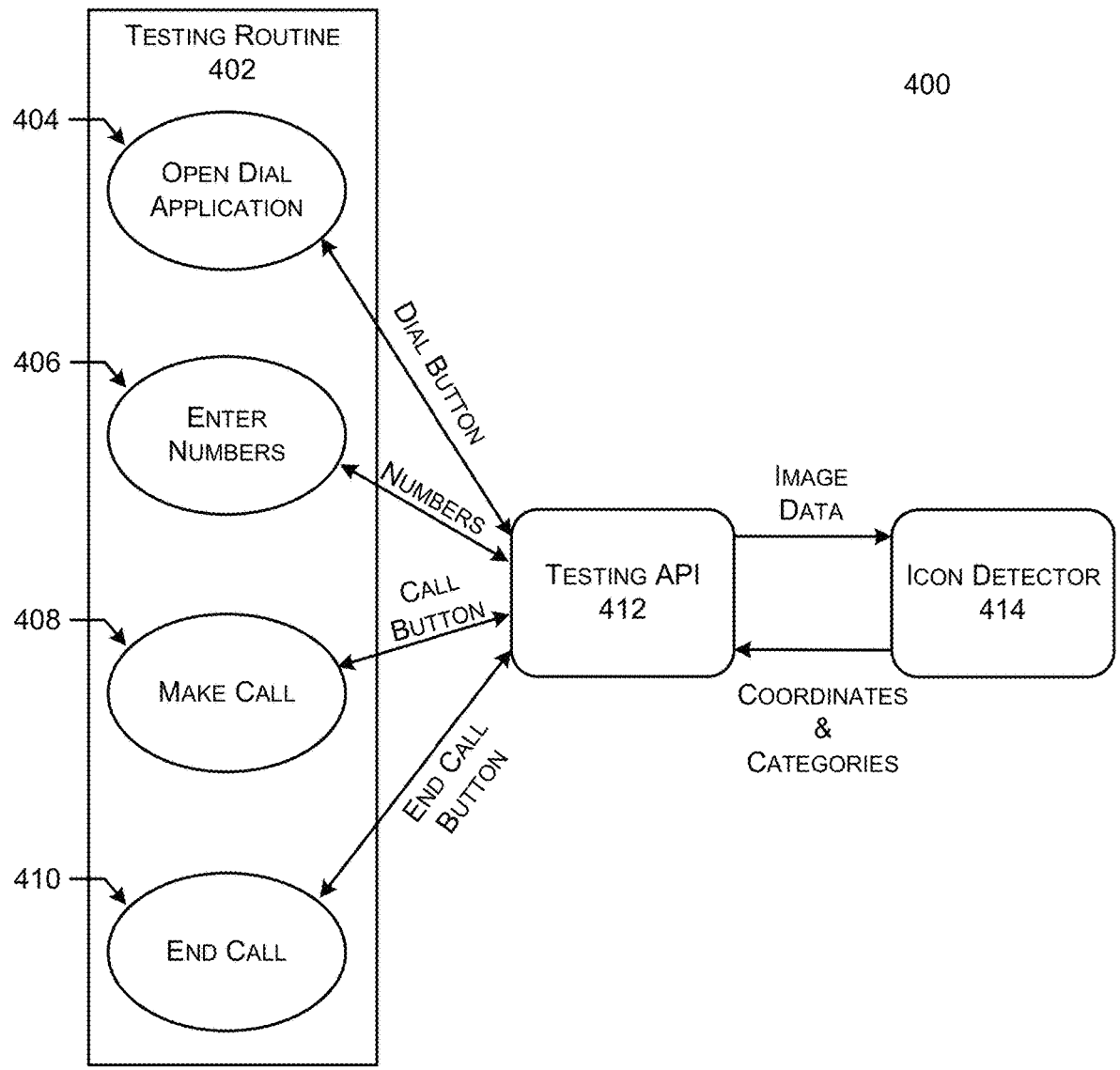
FIG. 4 depicts a block diagram illustrating an example of a process in which execution of a testing routine is automated.

FIG. 4 depicts a block diagram illustrating an example of a process 400 in which execution of a testing routine is automated. A testing routine 402 is depicted as a series of steps 404-410 to be executed during the testing routine. In some embodiments, the series of steps 404-410 of the testing routine may be determined from a testing flow maintained by a testing platform. In some embodiments, the series of steps 404-410 may be determined using one or more machine learning algorithms (e.g., ML module 212 of FIG. 2) based on interaction data received from a number of tester devices. A number of different testing routines may be executed each time that a software update is made to a mobile device to ensure that other services and functionality are not adversely affected by the software update. Each testing routine may be associated with a user goal that can be accomplished on the mobile device, such as making a phone call, etc.

The testing routine 402 may be executed automatically by accessing the functionality provided by a testing platform. In some embodiments, the functionality provided by the testing platform may be provided via a testing API 412 associated with the testing platform. For example, a mobile device may have installed upon it a testing application (e.g., testing application 226 of FIG. 2) that utilizes a testing API that enables interaction between the mobile device and the testing platform. The testing API may provide access to at least an icon detector module 414 implemented on the testing platform. Icon detector module 414 is an example of icon detector module 216 described with respect to FIG. 2.

In the process 400, each step of the testing routine 402 is performed automatically (e.g., without user interaction). By way of illustration, a testing application executed on the mobile device may, upon determining that the testing routine 402 is to be executed, initiate the step 404. To do this, image data (e.g., a snapshot) is provided to the icon detector 414 which returns a category of each currently available icon as well as corresponding coordinates for each icon. The process 400 then determines which of the available icons is used for the current step based on the icon categories and generates a user input action at the coordinates associated with the corresponding icon. In some embodiments, if the corresponding icon is not among the available icons, then an action may be generated to change a current screen of the mobile device. In some embodiments, a failure condition may be detected if the corresponding icon is not among the available icons. In the depicted example, step 404 is associated with the selection of a "Dial Button" icon. Accordingly, to complete step 404, the icon associated with a dial button category is identified within the available icon data provided by the icon detector and a user selection is generated at a set of coordinates associated with that icon. These techniques are then repeated for each of steps 406, 408, and 410 to complete the testing routine 402.

Figure 5:
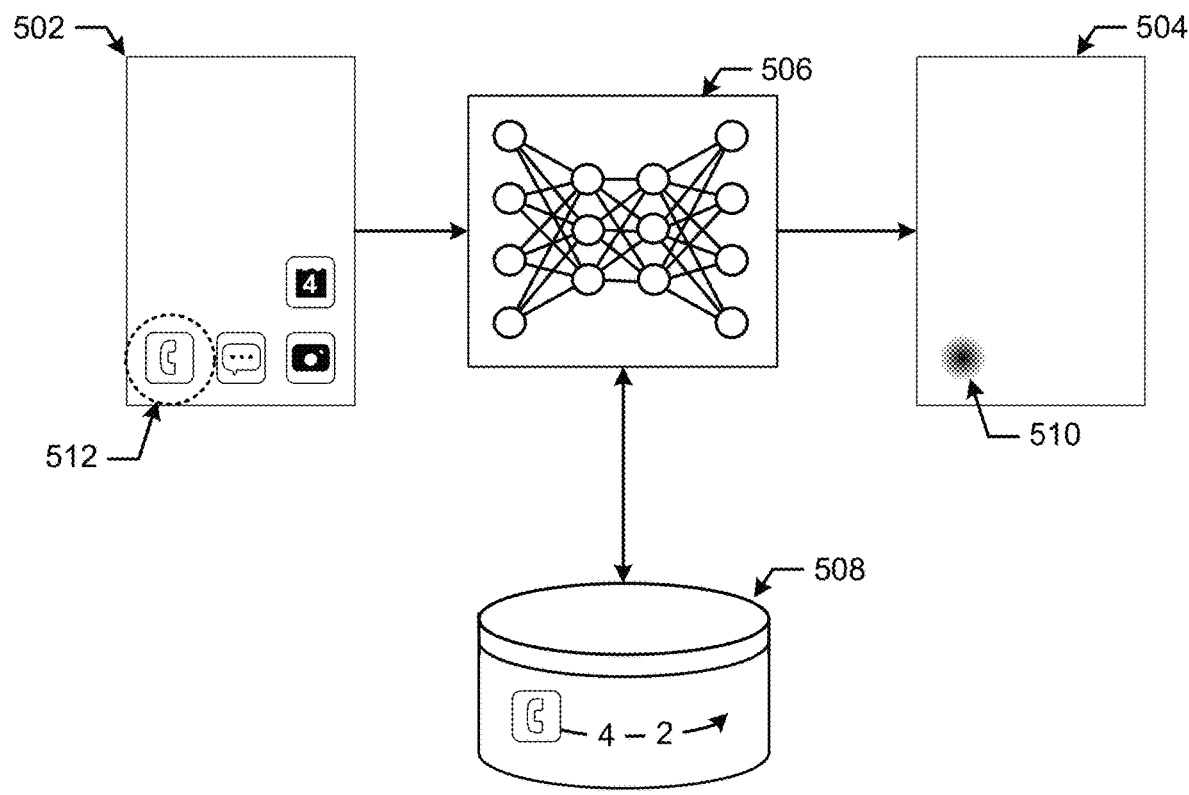
FIG. 5 depicts an example of a process by which a testing routine may be learned using visual analysis.

FIG. 5 depicts an example of a process by which a testing routine may be learned using visual analysis. In some embodiments, this may involve obtaining interaction data (e.g., interaction traces) from a number of mobile devices. In some cases, those mobile devices may be operated by testers or other agents of a testing system. In some cases, those mobile devices may be operated by users that are not affiliated with the testing system. For example, the testing system may receive interaction data from various users serviced by a wireless carrier network during the course of the user's typical use of his or her mobile device.

The interaction data may include an indication of actions conducted by a user 504 (e.g., locations of a touch selection) as well as screenshot images 502 captured by the mobile device at the time of those actions. In some embodiments, a set of interaction data received from a user may be associated with a user goal. For example, a series of actions performed by a user and the screenshots associated with that series of actions may be categorized as being associated with a user goal of making a phone call. In some embodiments, series of actions received from a number of users in relation to a common user goal may be aggregated. In some embodiments, such series of actions may be aggregated based on a type (e.g., model) of mobile device and/or operating system (or version) used by the user. For example, interaction data received from a number of different users that is related to a common goal for the different users may be aggregated or grouped based on a model and operating system for each of the different users. The aggregated interaction data is then provided to a machine learning algorithm 506 in order to draw correlations actions and visual elements (e.g., icons) in a trained learning model 508. In some embodiments, this may lead to separate trained learning models 508 generated for different combinations of mobile device type/operating system. In some embodiments, separate trained learning models 508 may be generated for different user goals.

Upon receiving an aggregated set of interaction data related to a particular user goal, a learning model may be trained to perform a testing routine associated with the performance of that user goal. This involves ordering each user interaction in the interaction data and associating it with a visual element. In some embodiments, outlier interactions may be removed from the aggregated set of interaction data. For example, extra user selections, or user selections for which coordinates are greater than some threshold distance from average coordinates for such a user selection, may be removed from the aggregated set of interaction data.

In some embodiments, available visual elements within snapshot data are categorized and located (e.g., via an icon detector module as described elsewhere). Coordinates of user selections 510 on the screen of the mobile device in the received interaction data are then compared to the coordinates of the identified visual elements in order to determine a most likely selected visual element 512 from those available. It should be noted that coordinates of user selections may vary across different users, such that an average of the coordinates of a user selection may be calculated from a distribution of such user selections (represented at 510 by a heat map).

In some embodiments, the process need not categorize visual elements within a screenshot. For example, the process may instead be trained to identify visual elements located in the screenshot at the coordinates of user selections 510 and simply associate those visual elements with the action.

In the manner described above, a trained model 508 may be trained to execute a testing routine based upon correlations between visual elements and user actions for each interaction of a series of interactions received from a set of users as well as an order in which those user actions should be performed. Once a learning model 508 has been trained to execute a testing routine in this manner, the execution of the testing routine may be automated.

To execute a testing routine, the trained model 508 is provided with a screenshot from a mobile device on which the testing routine is to be performed. In response to receiving the screenshot, the trained model 508 generates a user action to be performed based on visual elements identified within the screenshot as well as the order in which actions are to be performed. When the user action is performed on the mobile device, another screenshot is captured and provided to the trained model 508, which generates the next action in the testing routine. This is repeated until the testing routine is completed or a testing failure is detected.

Figure 6:
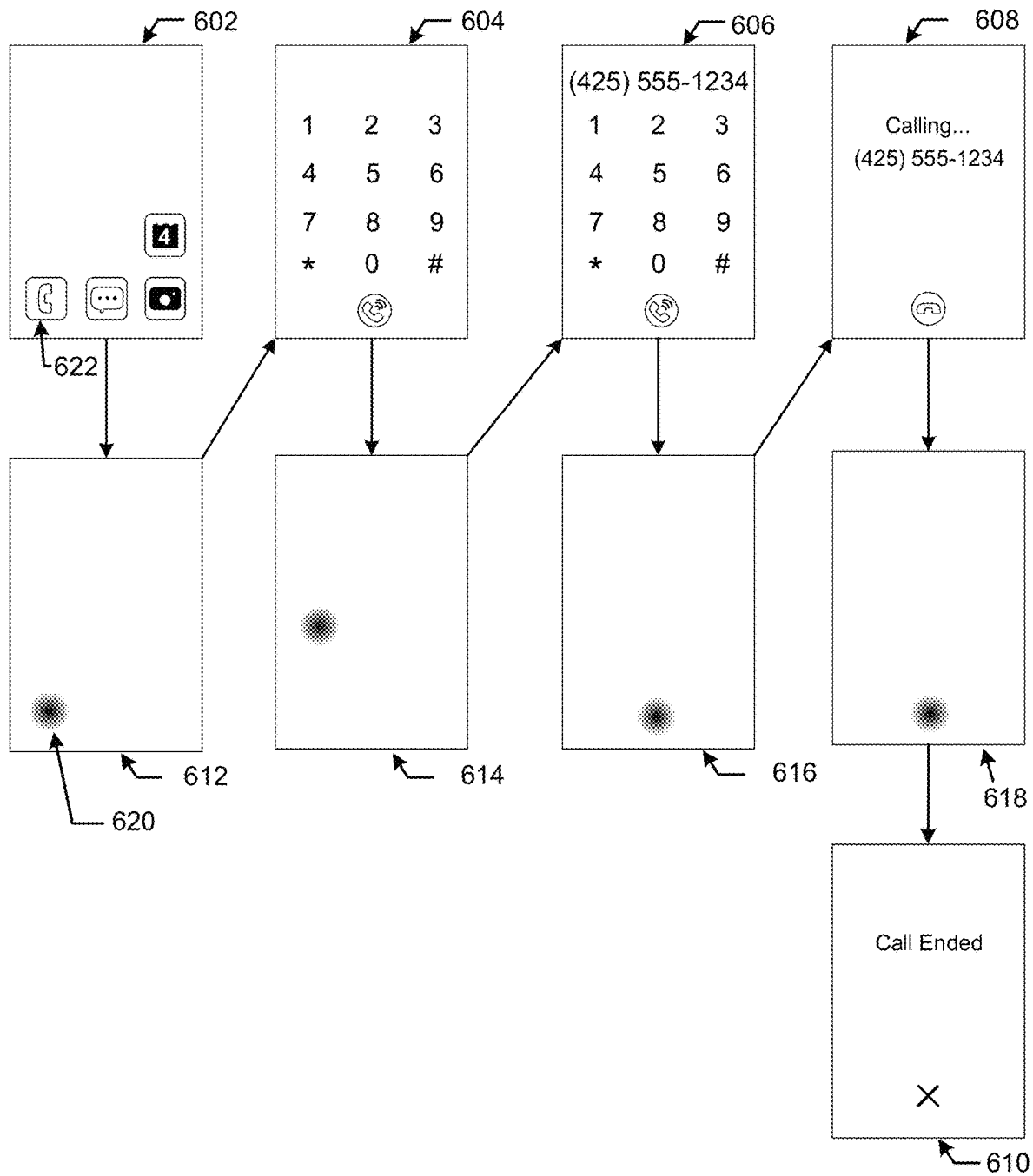
FIG. 6 depicts an example of a process in which a testing routine may be automated in accordance with at least some embodiments.

FIG. 6 depicts an example of a process in which a testing routine may be automated in accordance with at least some embodiments. The process 600 is depicted as a series of screenshots 602-610 and corresponding simulated user inputs 612-618. A simulated user input comprises instructions that, when executed by a mobile device, simulate a user touch at a particular location of the screen of the user device (e.g., by calling an API of the mobile device's OS responsible for detecting touchscreen input).

In the process 600, a mobile device may provide a screenshot 602 to a learning model and may be provided with a corresponding simulated user input 612 (as described in greater detail with respect to FIG. 5 above). The user input may include an indication of a location 620 on a screen of the mobile device at which a visual element 622 is located. The simulated user input 612 may include instructions to select an object at the location 620 (e.g., via simulation of a user touch at the location).

In the process 600, an execution of the simulated user input 612 on a mobile device may cause the mobile device to update the image presented on the screen of the mobile device. A snapshot 604 may then be captured of the image presented on the screen. The process 600 may be repeated a number of times until an end-state of the testing routine is reached. In this scenario, a simulated user input 614 may be determined upon processing snapshot 604. Snapshot 606 is obtained upon execution of simulated user input 614, from which simulated user input 616 is generated. Snapshot 608 is obtained upon execution of simulated user input 616, from which simulated user input 618 is generated. In this scenario, snapshot 610 is obtained upon execution of simulated user input 618. The testing routine may be ended upon determining that the screenshot 610 represents an end-state for the testing routine. For example, the screenshot 610 may be determined to be associated with a test success condition.

Figure 7:
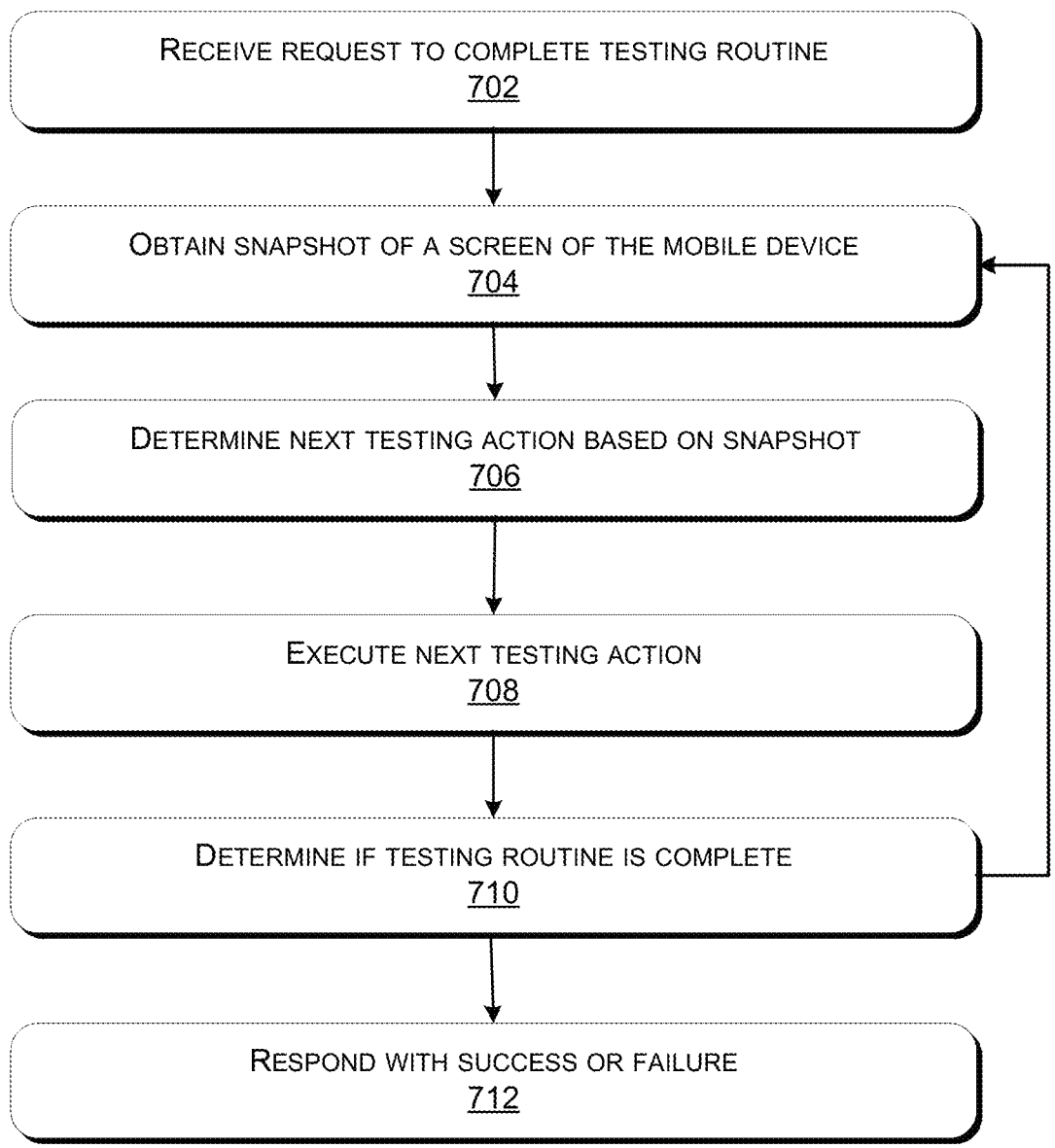
FIG. 7 depicts a flow diagram showing an example process flow for automating execution of a testing routine in accordance with some embodiments.

FIG. 7 depicts a block diagram showing an example process flow for automating execution of a testing routine in accordance with some embodiments. In accordance with embodiments, the process 700 may be performed by components within a testing system 102 as discussed with respect to FIG. 1 above. In some embodiments, such a component comprises the mobile device and the instructions comprise a testing application. In some embodiments, such a component comprises a server on which a testing platform is implemented.

At 702, the process 700 comprises receiving a request to complete a testing routine. In some embodiments, the testing routine is associated with a user goal. For example, the testing routine may pertain to making a call, sending a text message, accessing a website, or any other suitable task. In some embodiments, the testing routine is associated with a type of mobile device or an operating system of the mobile device.

At 704, the process 700 comprises obtaining a snapshot of a screen of the mobile device. In some embodiments, the current snapshot of a screen of the mobile device comprises a number of icons displayed upon the screen of the mobile device. In these embodiments, the process may further comprise determining a category and coordinates for each of the number of icons displayed upon the screen of the mobile device (e.g., via an icon detector module).

At 706, the process 700 comprises determining a next testing action based on the obtained snapshot. In some embodiments, determining a next testing action for the mobile device based on the current snapshot comprises providing the current snapshot to a machine learning model that has been trained based on actions taken by a number of users. For example, determining a next testing action may comprise providing the current snapshot to a trained machine learning model and receiving, in response, a next testing action comprising an action commonly taken by a number of users when executing the user goal. In some cases, the next testing action for the mobile device is also determined based at least in part on a type of the mobile device or an operating system installed upon the mobile device. In some embodiments, a testing routine is associated with a type of the mobile device or an operating system of the mobile device. In these embodiments, the next testing action for the mobile device is also determined based on a type of the mobile device or an operating system of the mobile device.

At 708, the process 700 comprises executing the next testing action. In some embodiments, executing the next testing action comprises simulating a human touch at a specific location on the screen of the mobile device. In these embodiments, the specific location on the screen of the mobile device corresponds to a location of an icon identified within the current snapshot, wherein that icon is determined to be associated with the next testing action.

At 710, the process 700 comprises determining if the testing routine is complete. The testing routine is determined to be complete upon detecting that the testing routine has reached an end-state. For example, the testing routine is determined to be complete upon determining the that the execution of the testing routine is a success or a failure. In this example, the execution of the testing routine may be determined to be a failure upon determining that the current snapshot does not match an expected snapshot. Additionally, in this example, the execution of the testing routine may be determined to be a success upon determining that the current snapshot is associated with an end of the testing routine. At 712, the process 700 comprises responding to the request with an indication whether the execution of the testing routing is a success or a failure.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
training a machine learning model based on a set of interaction data associated with a user goal, the interaction data including at least locations of touch selections and screenshot images, wherein the training includes removing outlier interactions from the set of interaction data, the outlier interactions including extra user selections or user selections for which coordinates are greater than a threshold distance from average coordinates for other user selections;
receiving a request to complete a testing routine on a mobile device;
until determining that the testing routine is complete, repeating a process that comprises:
obtaining a current snapshot of a screen of the mobile device;
determining, based on the current snapshot, whether testing is complete;
upon determining that testing is not complete, determining a next testing action for the mobile device based on the current snapshot, wherein determining the next testing action for the mobile device based on the current snapshot comprises providing the current snapshot to the machine learning model, and wherein the next testing action is an action commonly taken by a number of users when executing the user goal; and
executing the next testing action for the mobile device; and
responding to the request with whether the testing routine is a failure or success based upon the current snapshot.

2. The method of claim 1, wherein the next testing action for the mobile device is determined based on a type of the mobile device or an operating system of the mobile device.

3. The method of claim 1, wherein executing the next testing action comprises simulating a human touch at a specific location on the screen of the mobile device.

4. The method of claim 3, wherein the specific location on the screen of the mobile device corresponds to a location of an icon identified within the current snapshot.

5. The method of claim 4, wherein the icon is an icon determined to be associated with the next testing action.

6. A computing device comprising:
a processor; and
a memory including instructions that, when executed with the processor, cause the computing device to, at least:
training a machine learning model based on a set of interaction data associated with a user goal, the interaction data including at least locations of touch selections and screenshot images, wherein the machine learning model is one of a plurality of machine learning models respectively associated with a plurality of user goals;
receive a request to complete a testing routine on a mobile device, wherein the testing routine is associated with the user goal;
until determining that the testing routine is complete, repeat a process that comprises:
  obtaining a current snapshot of a screen of the mobile device;
  determining, based on the current snapshot, whether testing is complete;
  selecting the machine learning model from the plurality of machine learning models based on the user goal;
  upon determining that testing is not complete, determining a next testing action for the mobile device based on the current snapshot, wherein determining the next testing action for the mobile device based on the current snapshot comprises providing the current snapshot to the selected machine learning model, and wherein the next testing action is an action commonly taken by a number of users when executing the user goal; and
  executing the next testing action for the mobile device; and
respond to the request with whether the testing routine is a failure or success based upon the current snapshot.

7. The computing device of claim 6, wherein the computing device comprises the mobile device and the instructions comprise a testing application.

8. The computing device of claim 7, wherein the next testing action for the mobile device is also determined based at least in part on a type of the mobile device or an operating system installed upon the mobile device.

9. The computing device of claim 6, wherein the computing device is a server on which a testing platform is implemented.

10. The computing device of claim 6, wherein the current snapshot of the screen of the mobile device comprises a number of icons displayed upon the screen of the mobile device.

11. The computing device of claim 6, wherein the testing routine is determined to be a failure upon determining that the current snapshot does not match an expected snapshot.

12. The computing device of claim 10, wherein the instructions further cause the computing device to determine a category and coordinates for each of the number of icons displayed upon the screen of the mobile device.

13. The computing device of claim 6, wherein the testing routine is determined to be a success upon determining that the current snapshot is associated with an end of the testing routine.

14. The computing device of claim 6, wherein the testing routine is associated with the user goal.

15. A non-transitory computer-readable media collectively storing computer-executable instructions that upon execution cause one or more computing devices to collectively perform acts comprising:
training a machine learning model based on a set of interaction data associated with a user goal, the interaction data including at least locations of touch selections and screenshot images, wherein the training includes removing outlier interactions from the set of interaction data, the outlier interactions including extra user selections or user selections for which coordinates are greater than a threshold distance from average coordinates for other user selections;
receiving a request to complete a testing routine on a mobile device;
until determining that the testing routine is complete, repeating a process that comprises:
  obtaining a current snapshot of a screen of the mobile device;
  determining, based on the current snapshot, whether testing is complete;
  upon determining that testing is not complete, determining a next testing action for the mobile device based on the current snapshot, wherein determining the next testing action for the mobile device based on the current snapshot comprises providing the current snapshot to the machine learning model, and wherein the next testing action is an action commonly taken by a number of users when executing the user goal; and
  executing the next testing action for the mobile device; and
responding to the request with whether the testing routine is a failure or success based upon the current snapshot.

16. The non-transitory computer-readable media of claim 15, wherein the next testing action for the mobile device is determined based on a testing flow associated with the testing routine.

17. The non-transitory computer-readable media of claim 16, wherein the testing flow is an ordered series of steps generated by a user.

* * * * *